United States Patent [19]

Niimi

[11] 3,909,738

[45] Sept. 30, 1975

[54] AMPLIFIER DEVICE

[75] Inventor: Masayasu Niimi, Hiroshima, Japan

[73] Assignee: Hitachi, Ltd., Japan

[22] Filed: July 26, 1973

[21] Appl. No.: 382,694

[30] Foreign Application Priority Data

July 26, 1972 Japan .............................. 47-74181

[52] U.S. Cl. .................. 330/30 D; 330/29; 330/69; 358/27

[51] Int. Cl.[2] ........................................ H03F 3/68

[58] Field of Search ......... 330/29, 30 D, 69; 358/27

[56] References Cited

UNITED STATES PATENTS

| | | | |
|---|---|---|---|
| 3,452,289 | 6/1969 | Ryan | 330/29 X |
| 3,750,042 | 7/1973 | Peil | 330/29 |
| 3,772,463 | 11/1973 | Wakai et al. | 358/27 |

*Primary Examiner*—R. V. Rolinec
*Assistant Examiner*—Lawrence J. Dahl
*Attorney, Agent, or Firm*—Craig & Antonelli

[57] ABSTRACT

An amplifier device which dispenses with the normally required coupling capacitor between a band amplifier circuit and a color demodulator circuit, the band amplifier being used in the color restoring and color synchronizing system of a color television system. The amplifier device comprises a current source providing a constant current $I_0$, a first circuit to divide the constant current $I_0$ into two currents $I_1$ and $I_2$ and to control the current division ratio, a second circuit which includes a differential amplifier having the current $I_1$ as its constant-current source and to which an input signal is supplied, and a third circuit which has the current $I_2$ as its constant-current source and which has two current paths for dividing the current $I_2$ into two currents $I_5$ and $I_6$, one of the two current paths of the third circuit being connected to a corresponding one of the outputs of the second circuit.

10 Claims, 3 Drawing Figures

AMPLIFIER DEVICE

BACKGROUND OF THE INVENTION

1. Field of the Invention

The present invention relates to an amplifier device, and more particularly to an amplifier device which is required to be connected in direct coupling with an AGC circuit or the succeeding stage thereto and which controls the gain for an input signal on the basis of a control signal.

2. Description of the Prior Art

In, for example, the color restoring and color synchronizing system of a color television system, the color saturation adjustment and the color killer operation are effected by means of a band amplifier circuit. When these operations are performed, the output DC level of the band amplifier circuit fluctuates, and hence, the operating level of a color demodulator circuit fluctuates. A method, which hitherto has been adopted in order to solve such problem, consists in interposing a coupling capacitor between the band amplifier circuit and the color demodulator circuit.

With such a construction, however, a circuit for setting the DC level must be provided in every circuit. Besides, the capacitor usually has a considerably large capacity of approximately 400 – 1,000 pF. Therefore, when these circuits are provided in integrated form, the capacitor occupies a considerable part of the integrated circuit. For this reason, it is a common practice to integrate all of the other parts except the capacitor, so that the capacitor is separately provided and terminals are led out from the integrated circuit so as to connect the capacitor at the outside.

Accordingly, in the case where the color restoring and color synchronizing system, including the band amplifier circuit and the color demodulator circuit, is provided in an integrated form, the capacitor makes it difficult to construct the system in a single monolithic integrated circuit, which results in a large number of terminals for the connection with the outside.

SUMMARY OF THE INVENTION

It is therefore an object of the present invention to provide an amplifier device whose output DC level does not fluctuate.

Another object of the present invention is to provide an amplifier device which is suitable for provision in the form of an integrated circuit.

Still another object of the present invention is to provide an amplifier device which is suitable for use as a band amplifier circuit whose output DC level does not fluctuate even when the color saturation adjustment or the color killer operation is performed in the color restoring and color synchronizing circuit of a color television system.

Yet another object of the present invention is to provide an amplifier device which is suitable for incorporation into a single monolithic integrated circuit in such a manner that a band amplifier circuit and a color demodulator circuit are directly coupled in the color restoring and color synchronizing system of a color television system.

PREFERRED EMBODIMENTS OF THE INVENTION

The present invention will be described in detail hereunder in connection with the preferred embodiments.

Figure 1:
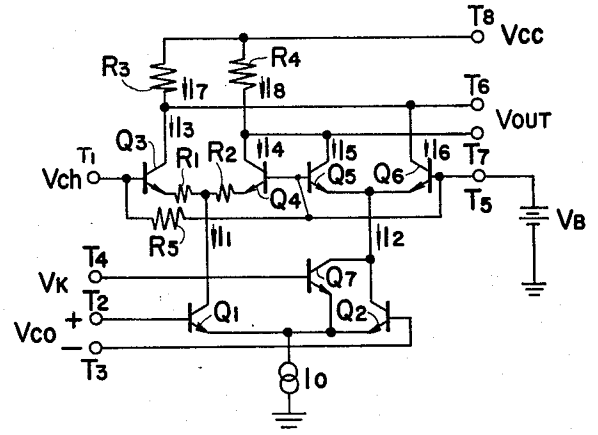
FIGS. 1 to 3 are schematic circuit diagrams each showing an embodiment of an amplifier device according to the present invention.

FIG. 1 shows a first embodiment of the amplifier device according to the present invention. In this embodiment, the invention is applied to a band amplifier circuit which is especially applicable to the color restoring and color synchronizing system of a color television system.

In the figure, $Q_1 - Q_7$ designate N-P-N transistors, $R_1 - R_5$ resistances, $I_0$ a current source of fixed current, and $T_1 - T_8$ terminals. The transistors $Q_1$ and $Q_2$ and the constant-current source $I_0$ constitute a differential amplifier. The emitter electrodes of the transistors $Q_1$ and $Q_2$ are commonly connected to one end of the current source $I_0$, the other end of which is grounded. The transistors $Q_3$ and $Q_4$ constitute a differential amplifier whose constant-current source is the collector current of the transistor $Q_1$. The emitter electrodes of the transistors $Q_3$ and $Q_4$ are commonly connected through the resistances $R_1$ and $R_2$. To the juncture between the resistances $R_1$ and $R_2$, the collector electrode of the transistor $Q_1$ is connected. The collector electrodes of the transistors $Q_3$ and $Q_4$ are connected to a power source ($V_{cc}$) terminal $T_8$ through the load resistances $R_3$ and $R_4$, and are further connected directly to output ($V_{out}$) terminals $T_6$ and $T_7$, respectively.

The transistors $Q_5$ and $Q_6$ constitute a differential amplifier whose constant-current source is the current flowing through the collector of the transistor $Q_7$ or transistor $Q_2$. After being commonly connected, the emitter electrodes of the transistors $Q_5$ and $Q_6$ are connected to the collector electrode of the transistor $Q_2$. The collector electrodes of the transistors $Q_5$ and $Q_6$ are respectively connected to the collector electrodes of the transistors $Q_4$ and $Q_3$. The base electrode of the transistor $Q_6$ is connected through the terminal $T_5$ to a bias power source $V_B$. Similarly, the base electrodes of the transistors $Q_4$ and $Q_5$ are connected through the terminal $T_5$ to the constant-voltage bias power source $V_B$. The base electrode of the transistor $Q_3$ is connected to the terminal $T_1$ to which a chroma signal $V_{ch}$ is supplied, and is also connected through the base resistance $R_5$ to the terminal $T_5$.

The transistor $Q_7$ has its collector electrode connected to the collector electrode of the transistor $Q_2$, has its emitter electrode connected in common with the emitter electrodes of the transistors $Q_1$ and $Q_2$, and has its base electrode connected to the terminal $T_4$ to which a color killer signal is supplied. The base electrodes of the transistors $Q_1$ and $Q_2$ are respectively connected to the terminals $T_2$ and $T_3$, across which a color saturation adjusting signal $V_{co}$ is supplied.

When the color killer signal $V_K$ is being supplied to the terminal $T_4$, the collector - emitter circuit of the transistor $Q_7$ is driven into the conductive state irrespective of the presence or absence of the color saturation adjusting signal $V_{co}$ across the terminals $T_2$ and $T_3$. The potentials of the emitter electrodes of the transistors $Q_1$ and $Q_2$ rise. The collector currents $I_1$, $I_3$ and $I_4$ of the transistors $Q_1$, $Q_3$ and $Q_4$ decrease largely, and become approximately zero. The transistors $Q_3$ and $Q_4$ do not operate, so that no output appears therefrom. Since, however, the color killer signal $V_K$ is supplied to the base electrode of the transistor $Q_7$ and the constant-current source is connected to the emitter electrodes of the transistors $Q_1$ and $Q_2$, the amount of the aforesaid decrease of the respective collector currents $I_1$, $I_3$ and $I_4$ is cancelled by an increase of the collector current of the transistor $Q_7$, namely, by increases of the collector currents of the transistors $Q_5$ and $Q_6$. For this reason, it holds that $I_0 = I_2 = I_5 + I_6 = I_7 + I_8$. If $I_5 = I_6$, each of the load currents $I_7$ and $I_8$ flowing through the resistances $R_3$ and $R_4$ is held constant at one-half $I_0$, and no output is provided across the output terminals $T_6$ and $T_7$ of the amplifier device. The DC voltage level of each of these terminals with respect to ground potential is expressed by $(V_{cc} - ½ I_0 R_L)$ (where $R_L$ denotes the resistance value of the resistors $R_3$ and $R_4$), and is constant.

Each of the load currents $I_7$ and $I_8$ reach a value substantially equal to one-half of the current of the constant-current source $I_0$ in the case of this circuit, for the reason that the transistors $Q_5$ and $Q_6$ constitute a differential amplifier having the current $I_2$ as its constant-current source and the respective base electrodes are connected in common.

There will now be described an example of the operation at the time when, with such a circuit, the color killer signal $V_K$ is not supplied and the color saturation adjusting signal $V_{co}$ is supplied. As the signal voltage $V_{co}$ becomes higher, the collector current $I_1$ of the transistor $Q_1$ further increases. Therefore, the collector currents $I_3$ and $I_4$ of the transistors $Q_3$ and $Q_4$ are so set that $I_3 = I_4$. At this time, the gain of the differential amplifier consisting of the transistors $Q_3$ and $Q_4$ changes.

On the other hand, the transistors $Q_1$ and $Q_2$ form a differential amplifier in which the constant-current source $I_0$ is connected to the commonly connected emitter electrodes. Therefore, when the aforesaid collector current $I_1$ of the transistor $Q_1$ increases, the collector current $I_2$ of the transistor $Q_2$ decreases in correspondence with the amount of increase of the collector current $I_1$, and the condition $I_1 + I_2 = I_0$ (constant) is always satisfied. Accordingly, the collector currents $I_5$ and $I_6$ of the transistors $Q_5$ and $Q_6$ decrease. The amount of decrease of the collector currents $I_5$ and $I_6$ cancel the aforesaid increase of the collector currents $I_3$ and $I_4$. For this reason, the load currents $I_7$ and $I_8$ flowing through the resistances $R_3$ and $R_4$ are held constant. It is thus possible to make constant the DC level across the output terminals $T_6$ and $T_7$ of this amplifier device.

Description will now be made of another example of the method of setting reference currents at various parts in the circuit of the present invention.

First, $I_0$ is made a constant current. It is divided into $I_1$ and $I_2$. As in the foregoing case, the current dividing ratio can be arbitrarily varied. Thus, $I_0 = I_1 + I_2$.

Next, the relations with the collector reference currents $I_3$ and $I_4$ of the transistors $Q_3$ and $Q_4$, including $I_3 \neq I_4$, are as set forth below.

$$I_1 = I_3 + I_4$$

$$I_3 = I_1 (1 - \alpha)$$

$$I_4 = I_1 \alpha$$

where $\alpha$ denotes the current dividing ratio. At this time, the same current dividing ratio is applied to $I_5$ and $I_6$, and they are as set forth below.

$$I_2 = I_5 + I_6$$

$$I_5 = I_2 \alpha$$

$$I_6 = I_2 (1 - \alpha)$$

Accordingly, $I_7$ and $I_8$ become as set forth below at this time.

$$I_7 = I_3 + I_6 = I_1 (1 - \alpha) + I_2 (1 - \alpha) = I_0 (1 - \alpha)$$

$$I_8 = I_4 + I_5 = I_1 \alpha + I_2 \alpha = \alpha (I_1 + I_2) = I_0 \alpha$$

$$I_7 + I_8 = I_0$$

In this case, the DC voltage levels of the terminals $T_6$ and $T_7$ with respect to ground become $V_{cc} - R_3 I_0 (1 - \alpha)$ and $V_{cc} - R_3 I_0 \alpha$, respectively, which are not affected by $V_K$ or $V_{co}$, either.

Figure 2:
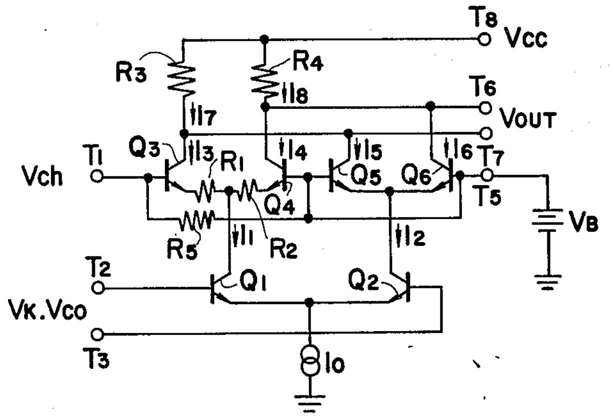

FIG. 2 shows another embodiment of the amplifier device according to the present invention. The point of difference from the embodiment in FIG. 1 is that the transistor $Q_7$ employed in the previous embodiment in order to supply the color killer signal $V_K$ is removed, and that the color killer signal is fed across the terminals $T_2$ and $T_3$ along with the color saturation adjusting signal $V_{co}$. Further, the juncture between the collector electrode of the transistor $Q_4$ and the resistance $R_4$ is connected to the terminal $T_6$ together with the collector electrode of the transistor $Q_6$, while the juncture between the collector electrode of the transistor $Q_3$ and the resistance $R_3$ is connected to the terminal $T_7$ together with the collector electrode of the transistor $Q_5$. This arrangement, however, is the same as in the case of FIG. 1 if $I_3 = I_4$ and $I_5 = I_6$. The other construction and operation are similar to the case of FIG. 1, and the detailed explanation is omitted.

Figure 3:
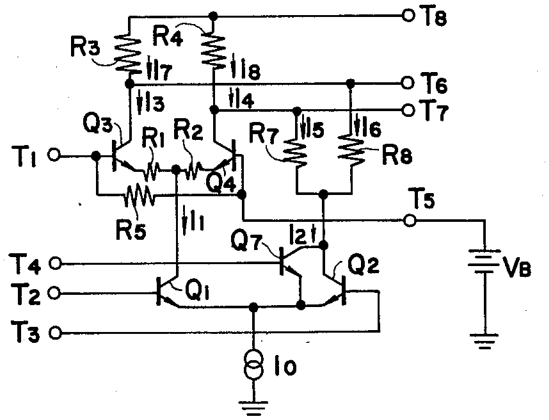

FIG. 3 shows still another embodiment of the amplifier device according to the present invention. The point of difference from the embodiment in FIG. 1 resides in that the transistors $Q_5$ and $Q_6$ constituting the differential amplifier in FIG. 1 are replaced by resistors $R_7$ and $R_8$ of high resistance. In this case, the resistors $R_7$ and $R_8$ are commonly connected at one end, and then connected to the collector electrode of the transistor $Q_2$. The other ends of the resistors $R_7$ and $R_8$ are respectively connected to the collector electrodes of the transistors $Q_4$ and $Q_3$.

Even with such a construction, when the collector current $I_1$ of the transistor $Q_1$ and the collector currents $I_3$ and $I_4$ of the transistors $Q_3$ and $Q_4$ increase, the variations are cancelled by decreases in the collector current $I_2$ of the transistor $Q_2$ and in the currents $I_5$ and $I_6$ respectively flowing through the resistors $R_7$ and $R_8$. The load currents $I_7$ and $I_8$ respectively flowing through the load resistors $R_3$ and $R_4$ can thus be held constant.

Although the embodiments which have been explained relate to the case where the present invention is applied to a band amplifier circuit for use in the color restoring and color synchronizing system of a color television system, the invention may of course be applied to an amplifier device for which it is a requirement that the output DC level not fluctuate due to the gain control.

As described above, with the amplifier device according to the present invention, even when the control input signal fluctuates, the DC level on the output side does not vary. In addition, according to the present invention, a capacitor of large capacity is not required, so that the device is suitable for use in an integrated circuit. Besides, when the present invention is applied to the chroma circuit of a color television system, the output DC level is not varied even by carrying out the color saturation adjustment or the color killer operation. Moreover, the band amplifier circuit and the color demodulator circuit can be directly coupled. The employment of the coupling capacitor as in the prior art is accordingly unnecessary, which makes it possible to construct these circuits in the form of a single monolithic integrated circuit. The number of connection pins can therefore be reduced.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. An amplifier device comprising a constant current source providing a constant first current, a first differential amplifier means for dividing said constant first current into second and third currents in accordance with a controllable current division ratio, a second differential amplifier means connected to said first differential amplifier means to receive said second current as its constant-current source and having one input supplied with an input signal, a third differential amplifier means connected to said first differential amplifier means to receive said third current as its constant-current source and having two current paths for dividing said third current into respective fourth and fifth currents, one of said two current paths of said third differential amplifier means being connected to one of the outputs of said second differential amplifier means, and the other input of said second differential amplifier means being connected to one of the inputs of said third differential amplifier means, and constant bias means connected to both of said inputs of said third differential amplifier means.

2. An amplifier device as defined in claim 1, wherein said first differential amplifier means includes a transistor differential amplifier having its emitter circuit connected to said constant current source providing said constant first current.

3. An amplifier device as defined in claim 2, wherein said transistor differential amplifier comprises first and second transistors having their emitters connected together to said constant current source providing said constant first current, and a third transistor having its collector and emitter connected to the collector and emitter of said second transistor.

4. An amplifier device comprising a constant current source providing a first current, a first differential amplifier means connected to said constant current source for dividing said first current into second and third currents in accordance with a controllable current division ratio, a second differential amplifier means connected to said first differential amplifier means to receive said second current and having one input connected to a signal input terminal and the other input connected to a constant-voltage bias source, and current control means constituted by first and second resistors, each of said first and second resistors having one terminal connected in common to said first differential amplifier means for dividing said third current into fourth and fifth currents, and the other terminal of one of said first and second resistors being connected to one of the outputs of said second differential amplifier means.

5. An amplifier device as defined in claim 4, wherein said first differential amplifier means comprises a transistor differential amplifier having its emitter circuit connected to said constant current source and one output connected to the emitter circuit of said second differential amplifier means.

6. An amplifier device as defined in claim 5, wherein said current paths of said current control means have one end connected together to the other output of said first differential amplifier means.

7. An amplifier device as defined in claim 6, wherein said first differential amplifier means comprises first and second transistors having their emitters connected together to said constant current source and a third transistor connected in parallel with said second transistor.

8. An amplifier device comprising:

a current source providing a constant amplitude direct current;

a first pair of amplifier means each having input, output and common electrodes, said common electrodes of said first pair of amplifier means being connected to said current source;

means for supplying a gain control signal to said input electrodes of said first pair of amplifier means so as to control the ratio of direct currents which are divisions of said constant amplitude direct current and which flow through said first pair of amplifier means;

a second pair of amplifier means each having input, output and common electrodes, said common electrodes of said second pair of amplifier means being connected to the output electrode of one of the amplifier means of said first pair of amplifier means;

means for supplying a signal to be amplified to said input electrodes of said second pair of amplifier means;

a terminal for supplying a power source;

direct-current connecting means connected between said terminal and said output electrodes of said second pair of amplifier means, respectively, said direct-current connecting means including at least one load resistor;

means coupled to said at least one load resistor for deriving an output signal; and a pair of direct-current supplying means each having output and common electrodes, said output electrodes of said pair of direct-current supplying means being connected to said output electrodes of said second pair of amplifier means, respectively, said common electrodes of said pair of direct-current supplying means being commonly connected to the output electrode of the other amplifier means of said first pair of amplifier means, said pair of direct-current supplying means dividing the direct current flowing through said other amplifier means of said first pair of amplifier means so that the respective direct-currents flowing through said direct-current connecting means become substantially constant irrespective of changes of said gain control signal.

9. An amplifier device as defined in claim 8, wherein said pair of direct-current supplying means comprises a third pair of amplifier means each having input, output and common electrodes, said output electrodes of said third pair of amplifier means being connected to said output electrodes of said second pair of amplifier means, respectively, said common electrodes of said third pair of amplifier means being commonly connected to the output electrode of said other amplifier means of said first pair of amplifier means, and said input electrodes of said third pair of amplifier means being connected to constant bias means.

10. An amplifier device as defined in claim 8, wherein said pair of direct-current supplying means comprises a pair of resistors.

* * * * *